United States Patent [19]

Pluequet

[11] 4,035,295

[45] July 12, 1977

[54] FILTERING ARRANGEMENT FOR INTERNAL COMBUSTION ENGINES

[75] Inventor: Heinz Pluequet, Cologne, Germany

[73] Assignee: Klockner-Humboldt-Deutz Aktiengesellschaft, Cologne, Germany

[21] Appl. No.: 579,010

[22] Filed: May 19, 1975

[30] Foreign Application Priority Data

May 17, 1974 Germany .......................... 2424180

[51] Int. Cl.² ....................................... B01D 29/42
[52] U.S. Cl. ................................. 210/136; 210/341
[58] Field of Search .......... 210/117, 136, 340, 341, 210/332–334

[56] References Cited

U.S. PATENT DOCUMENTS

| 276,820 | 5/1883 | Howes | 210/333.1 |
|---|---|---|---|
| 2,095,447 | 10/1937 | Lentz | 210/333.1 |
| 3,154,485 | 10/1964 | Liddell | 210/128 |
| 3,679,060 | 7/1972 | Smith | 210/333.1 |

Primary Examiner—John Adee

Attorney, Agent, or Firm—Walter Becker

[57] ABSTRACT

A filtering arrangement for internal combustion engines, especially for filtering fuel and oil which comprises at least two filtering units arranged in housing means, each filtering unit having a filtering insert. The medium to be filtered enters the filtering units between the filter housing means and the filtering inserts. The filtering arrangement is provided with an inlet and outlet connection common to all filtering units. A change-over valve is built into these inlet and outlet connections in such a way that the filtering units can individually and/or together be placed into communication with the inlet and outlet connection and with a discharge connection communicating with the lowermost areas of the interior of the filter housing means and being controlled by a shut-off valve. This shut-off valve is coupled directly to the change-over valve in such a way that the interior of the filter housing means of that filter unit which is disconnected from the inlet and outlet connection communicates with the discharge connection.

4 Claims, 5 Drawing Figures

U.S. Patent     July 12, 1977     4,035,295
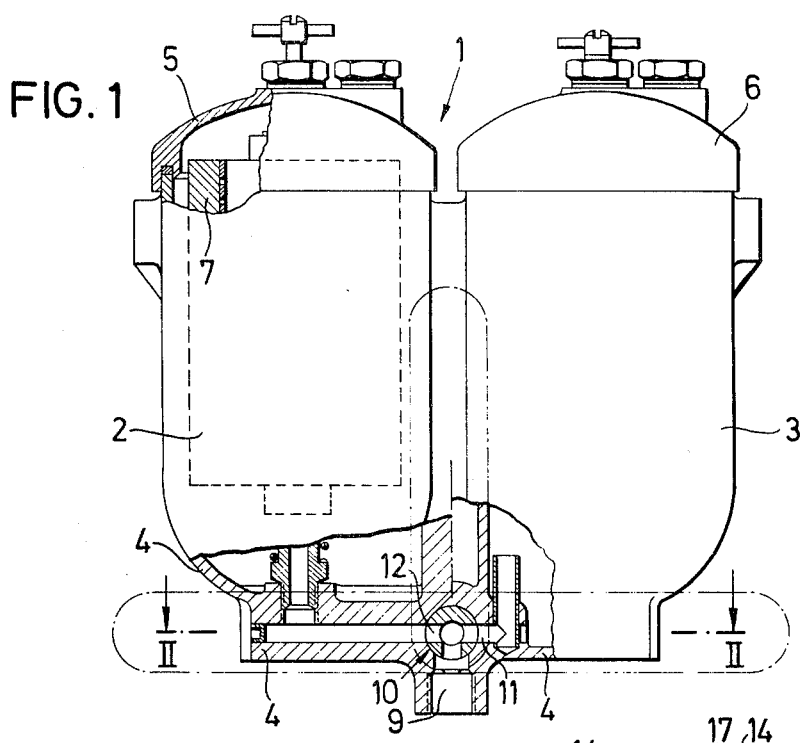
FIG. 1
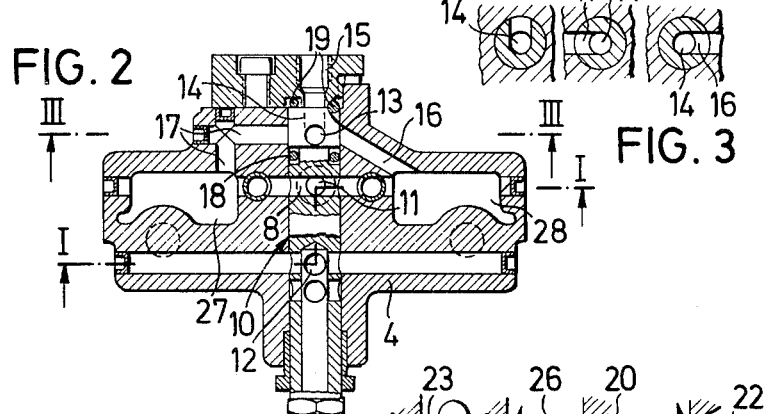
FIG. 2
FIG. 3
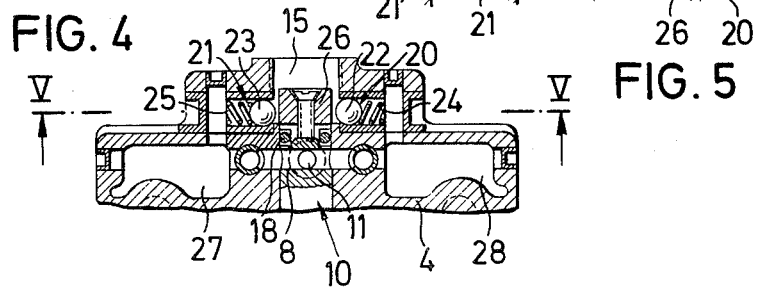
FIG. 4
FIG. 5

FILTERING ARRANGEMENT FOR INTERNAL COMBUSTION ENGINES

The present invention relates to a filtering installation for internal combustion engines, especially for filtering fuel or oil. More specifically, the present invention concerns a filtering installation of the above mentioned type which comprises at least two filters with one filtering housing each and a filtering insert. The medium to be filtered enters the filter between the filtering housing and the filtering insert. The filtering installation is furthermore equipped with an inlet and outlet connection which is common to all filters. A change-over valve is so arranged in said inlet and outlet connections that the filters can individually and/or together be connected to the inlet and outlet connection. Finally, the filtering installation according to the invention furthermore comprises a discharge connection which is connectable to the lowermost areas of the inner chambers of the filter housing. The said discharge connection has associated therewith a shut-off valve for controlling the same.

A filtering installation has been described in U.S. Pat. No. 3,154,485 which is equipped with two change-over valves which are adapted by conveying means to be controlled by one lever. This heretofore known filtering installation, however, concerns a return rinsing filtering installation with two filters in which each time only one of the filters can be connected to the circuit while the other filter during this time period remains idle. By additional actuation of said lever, the idling filter can be flushed back to which end said idling filter is connected to a discharge connection. By means of an additional lever, the shut-off valve of a discharge connection may also be actuated separately, but such instance is only an exception with the filtering installation of the type involved. In this connection similar to the situation encountered with an automatic discharge screw, the reliability of the operation depends very much on the operator namely for instance whether the fuel is discharged from the filter prior to the exchange of the filter cartridge. Therefore, it is not sure that the danger of fire can properly be avoided when fuel sprays in the vicinity of an internal combustion engine. In addition thereto, the above known filtering installation requires relatively many parts, is expensive, and requires considerable space.

It is, therefore, an object of the present invention to provide a filtering installation which not only will obviate the above mentioned drawbacks but will improve the above outlined filtering installation to such an extent that without great efforts an easy discharge with sludge will be obtained. In this connection, it should be assured that during the change-over, i.e. when turning off one of the filters to be cleaned, the latter will safely and surely be emptied so that all protective steps have been met.

These and other objects and advantages of the invention will appear more clearly from the following specification in connection with the accompanying drawings, in which:

FIG. 1 illustrates a filtering installation according to the invention with two filters, showing the filter housing sectioned partly along the line I—I of FIG. 2.

FIG. 2 represents a section through the lower portion of the filter housing, said section being taken along the line II—II of FIG. 1.

FIG. 3 represents a section taken along the line III—III of FIG. 2.

FIG. 4 is a partial section through the lower portion of the filter housing, but differs from that of FIG. 1 with regard to the design of its shut-off valve.

FIG. 5 represents a section taken along the line V—V of FIG. 4.

The filtering installation according to the present invention is characterized primarily in that the shut-off valve is directly coupled to the change-over valve in such a way that the inner chamber of the filter housing of that filter which is disconnected from the inlet and outlet connection is connected to the discharge connection.

Due to this design of the invention, simultaneously with the changing over of the filter, a discharge and a sludge discharge of that filter is effected which is disconnected from the filter circuit. The heretofore known filtering installation above referred to is therefore so improved that independently of the attention of the operator, the above outlined errors cannot occur any longer. Due to the fact that the shut-off valve is coupled to the change-over valve, the discharge connection is furthermore automatically closed when the filter housing is connected to the inlet connection so that also any superfluous flow-off or escape of fuel will be possible.

With a filtering installation in which the change-over valve is designed as rotary slide valve with a star wheel each for the input and discharge conduit, the shut-off valve may advantageously be so designed that the rotary valve has an additional star wheel which functionally is arranged between the inner chambers of the filter housing and the discharge connection. Such change-over valve- shut-off valve unit can be prepared in a simple and relatively inexpensive manner. Merely an extended rotary slide valve and a somewhat enlarged housing part is necessary. Furthermore, it is suggested that the star wheel of the shut-off valve is arranged at the inner end of the rotary slide valve and is adapted through radial bores to be connected by conduits with the inner chambers of the filter housing and at its end face is provided with a bore which communicates with the discharge connection. This design results in a simple and low-price manufacture of the shut-off valve.

Another design of the shut-off valve for use in connection with the filtering installation in which the change-over valve is designed as rotary slide valve with one star wheel for the inlet and discharge connection consists in that the inner end of the rotary slide valve bore communicates with the discharge connection and with one conduit each leads to the inner chambers of the filter housing. The design is furthermore characterized in that in the conduits leading to the inner chambers of the filter housing there is arranged one spring-loaded check valve each. These check valves are adapted by means of the rotary valve slide to be moved into opening position. With such a design, the spring loaded check valves may in a simple manner be designed as balls which extend into the rotary slide valve bore, and the rotary valve may be provided with a cam by means of which the balls can be moved into opening position against the thrust of the spring.

Referring now to the drawing in detail, the arrangement shown in FIG. 1 represents a filter installation 1 comprising two filters 2 and 3. The filters 2 and 3 have a common filter housing 4 (see filter 2) and one filter cover each respectively numbered 5 and 6. As will likewise be seen from FIG. 2, each filter has respectively arranged therein a filter insert 7 so that the fuel enters the filter between the filter housing and the filter insert and is discharged from the filter housing through a central bore of the filter inserts. Consequently, the sludge and soil of the medium to be filtered collects between the filter housing and the filter insert and in particular at the filter bottom. Within the lower region of the filter installation there is provided an inlet connection 8 (FIG. 2) and an outlet or discharge connection 9, said connections operating with a change-over valve 10. The valve 10 is designed as a rotary slide valve and has an inflow or inlet star wheel 10 and an outflow or discharge star wheel 12 which through conduits in a manner known per se communicate with each inner chamber of the filter housing and the central bore of the filter insert.

As will be seen from FIG. 2, the change-over valve 10 designed as rotary slide valve has an extension in which an additional star wheel 13 is arranged. The star wheel 13 communicates with a bore 14 located at the inner face and provided with a discharge connection 15. The radial bores of the star wheel 13 communicate through conduits 16, 17 with the lowermost areas 27 and 28 of the inner chambers of the filter housing so that the sludge and soil can be withdrawn from the lowermost areas where the sludge and soil collects due to gravity. Between the inlet star wheel 11 and the star wheel 13 and at the inner end of the rotary slide valve there is each inserted a sealing ring 18 and 19 located between the rotary slide valve and the housing 4. These rings are made of rubber or synthetic material and bring about a separate seal of the star wheel 13.

FIG. 3 shows the individual positions of the star wheel 13. As will be seen, the radial bore is, when occupying its end positions, in communication either with the conduit 16 or with the conduit 17.

FIGS. 4 and 5 show a further embodiment of the invention. The change-over valve 10 is designed in a customary manner and has its end provided with a ring 18 which seals the inlet star wheel 11 relative to the housing. With this enbodiment, the discharge connection 15 communicates with the inner end of the rotary slide valve-receiving bore. In the radial direction with regard to this bore, there branch off in opposite directions radial bores 20 and 21 which communicate with the lowermost areas 27 and 28 of the inner chambers of the filter housing. The radial bores 20 and 21 have at their inner end one constriction each while when viewed radially outside these constrictions, there are provided balls 22 and 23 which sealingly engaged said constrictions. These balls are continuously urged against the constrictions by compression springs 24 and 25. At the end face end of the change-over valve 10 in the plane of the balls 22 and 23, a cam 26 is non-rotatably connected to the change-over valve 10 and is arranged at such an angle with regard to the inlet star wheel 11 and the non-illustrated outlet star wheel 12 that, as illustrated in FIG. 5, the cam presses that ball back against the thrust of the spring and thus opens the conduit, which leads to the filter which latter is then disconnected from the fuel inlet and outlet.

It is, of course, to be understood that the present invention is, by no means, limited to the specific showing in the drawings, but also comprises and modifications within the scope of the appended claims.

What I claim is:

1. A filter arrangement for internal combustion engines, especially for filter fuel and oil, which includes: filter housing means, at least two filtering units arranged in said filter housing means, a plurality of filtering inserts respectively arranged in said filtering units for receiving the medium to be filtered between said filtering inserts and the interior of the pertaining filter housing means, said filtering arrangement being provided with an inlet connection common to all filtering units and with an outlet connection common to all filtering units, said filtering arrangement also being provided with a discharge connection communicating with the lowermost areas of the interior of said filter housing means, change-over valve means built into said inlet and outlet connections and operable selectively to place said filtering units individually and together into and out of communication with said inlet and outlet connections and with said discharge connection, and shut-off valve means associated with said change-over valve means and operable to establish communication of the interior of said filter housing means pertaining to that filter unit which is disconnected from said outlet connection with said discharge connection, said change-over valve being designed as a rotary valve comprising a star wheel for said inlet connection and a star wheel for said outlet connection, said change-over valve being provided with a bore having an inner end communicating with said discharge connection, first and second conduit means for respectively establishing communication between said inner end of said bore with said discharge connection and between said inner end of said bore and the interior of said filter housing means, and spring-loaded check valve means respectively arranged in said first and second conduit means and continuously urged to their closing positions, said check valve means being movable by said change-over valve to its open position.

2. A filtering arrangement according to claim 1, in which said change-over valve is a rotary valve comprising two first star wheels respectively provided for said inlet and outlet connections and comprising a second star wheel operatively arranged between the interior of said filter housing means and said discharge connection.

3. A filter arrangement according to claim 2, in which said second star wheel is arranged at the inner end of said rotary valve, and comprises radial bores, and which includes conduit means for connecting said second star wheel through said radial bores and said conduit means with the interior of said filter housing means, said second star wheel having an end face thereof provided with a bore communicating with said discharge connection.

4. A filtering arrangement according to claim 1, in which each of said check valve means includes a ball continuously spring-urged into the bore of said change-over valve, and in which an end face of said change-over valve has a cam connected thereto operable to move back the respective adjacent one of said balls against the thrust of the respective spring action thereupon thereby opening the respective check valve means.

* * * * *